(12) United States Patent
Woodruff

(10) Patent No.: US 7,862,008 B2
(45) Date of Patent: Jan. 4, 2011

(54) WINCH WITH TENSION INDICATOR

(76) Inventor: Rollin Woodruff, 117400 SW. Florence St., Aloha, OR (US) 97007

( * ) Notice: Subject to any disclaimer, the term of this patent is extended or adjusted under 35 U.S.C. 154(b) by 37 days.

(21) Appl. No.: 12/294,034

(22) PCT Filed: Mar. 22, 2007

(86) PCT No.: PCT/US2007/007259

§ 371 (c)(1),
(2), (4) Date: Sep. 22, 2008

(87) PCT Pub. No.: WO2007/112008

PCT Pub. Date: Oct. 4, 2007

(65) Prior Publication Data

US 2009/0224219 A1  Sep. 10, 2009

Related U.S. Application Data

(60) Provisional application No. 60/785,413, filed on Mar. 22, 2006.

(51) Int. Cl.
*B21F 9/00* (2006.01)
(52) U.S. Cl. ........................ 254/218; 254/237
(58) Field of Classification Search ................ 254/218, 254/223, 237, 365, 368, 369, 376
See application file for complete search history.

(56) References Cited

U.S. PATENT DOCUMENTS

| | | | | |
|---|---|---|---|---|
| 4,339,251 A | | 7/1982 | Shumate | |
| 4,456,227 A | * | 6/1984 | Notenboom | 254/350 |
| 4,542,883 A | * | 9/1985 | Rutzki | 254/217 |
| 5,217,208 A | * | 6/1993 | Stephenson | 254/213 |
| 5,364,073 A | * | 11/1994 | Sell | 254/369 |
| 6,116,580 A | * | 9/2000 | Hull | 254/357 |
| 6,149,132 A | * | 11/2000 | Ostrobrod | 254/368 |
| 6,446,936 B1 | * | 9/2002 | Ostrobrod | 254/368 |
| 6,527,405 B2 | * | 3/2003 | Hsieh | 362/119 |
| 6,726,182 B2 | * | 4/2004 | Topping et al. | 254/376 |
| 6,799,751 B1 | * | 10/2004 | Anderson | 254/223 |
| 6,960,053 B2 | | 11/2005 | Woodruff | |
| 7,159,852 B2 | * | 1/2007 | Dow et al. | 254/342 |
| 7,229,065 B2 | * | 6/2007 | Scott et al. | 254/237 |
| 7,350,767 B2 | * | 4/2008 | Huang | 254/218 |
| 7,374,152 B2 | * | 5/2008 | Ruan | 254/217 |
| 2005/0211959 A1 | | 9/2005 | Ruan | |

OTHER PUBLICATIONS

International Search Report, mailed Sep. 2, 2008, in International Application No. PCT/US07/07259.
Written Opinion of the International Searching Authority, mailed Sep. 2, 2008, in International Application No. PCT/US07/07259.

* cited by examiner

*Primary Examiner*—Emmanuel M Marcelo
(74) *Attorney, Agent, or Firm*—Klarquist Sparkman, LLP

(57) ABSTRACT

A winch has a color area or other indicium that indicates whether an elongate member extending from winch spool is or is not tensioned. The winch includes a biasing member between a winch drive system and the spool that allows only limited rotation of the spool relative to the drive system. Movement of the drive system relative to the winch spool causes the indicium to signal that the elongate member is under tension.

13 Claims, 7 Drawing Sheets

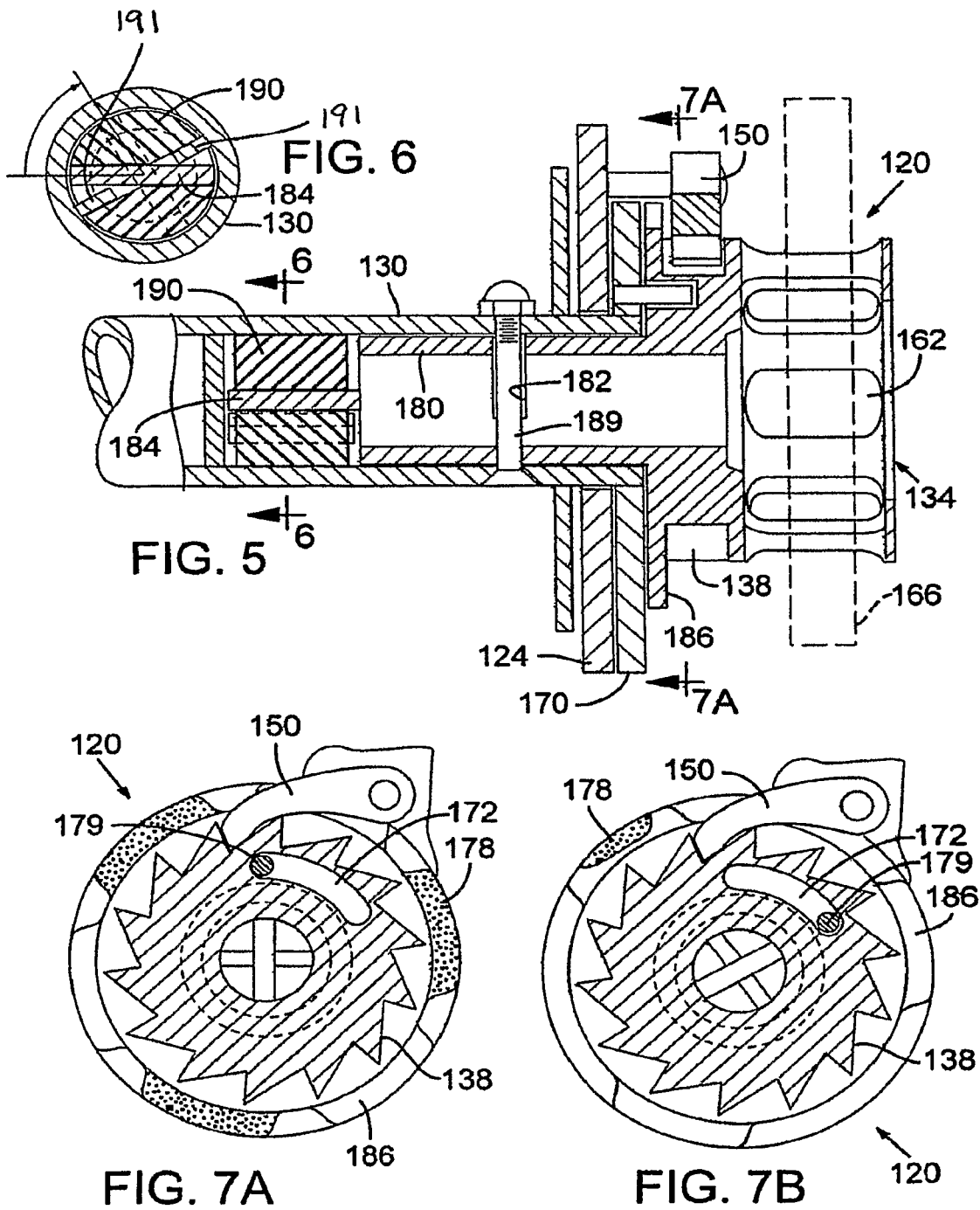

WINCH WITH TENSION INDICATOR

CROSS-REFERENCE TO RELATED APPLICATION

This claims the benefit of U.S. Provisional Application No. 60/785,413, filed Mar. 22, 2006, which is incorporated herein in its entirety.

BACKGROUND AND SUMMARY

This disclosure concerns manually operated winches. In particular, the disclosure concerns winches of the type used to secure cargo on transport vehicles such as trucks, trailers, railcars, ships and airplanes.

When heavy or bulky cargo needs to be secured for transport, it is common to use elongate members such as chains, ropes or belts to secure the cargo in place. The elongate members are typically tightened by hand-operated winches. For example, on a trailer designed to transport automobiles, it is typical to secure each automobile by means of a chain that is tightened by a hand-operated winch. Examples of prior winches are described in U.S. Pat. Nos. 3,038,740, 5,145,299, 5,180,262, and 5,314,275.

Prior winches typically include a ratchet mechanism that can hold an elongate member taut. But in cases where cargo has shifted during transit, the elongate member may become slackened, allowing the load to move and cause damage or to shift to a position where it more likely will fall when the elongate member is released at the time of unloading.

Accordingly, there remains a need for winch mechanisms that can be operated easily and will provide a warning if an elongate member becomes unduly slackened.

Features and advantages of new winch systems will be understood by reference to the following detailed description and to the drawings to which it refers.

BRIEF DESCRIPTION OF THE DRAWINGS

In the drawings:

FIG. 5 is an oblique view of a second winch system.
FIG. 6 is a vertical, sectional view taken along line 7--7 of FIG. 5.
FIG. 7A is a vertical, sectional view taken along line 8--8 of FIG. 5.
FIG. 7B is a vertical, sectional view taken along line 8--8 of FIG. 5.

DETAILED DESCRIPTION

Figure 1:
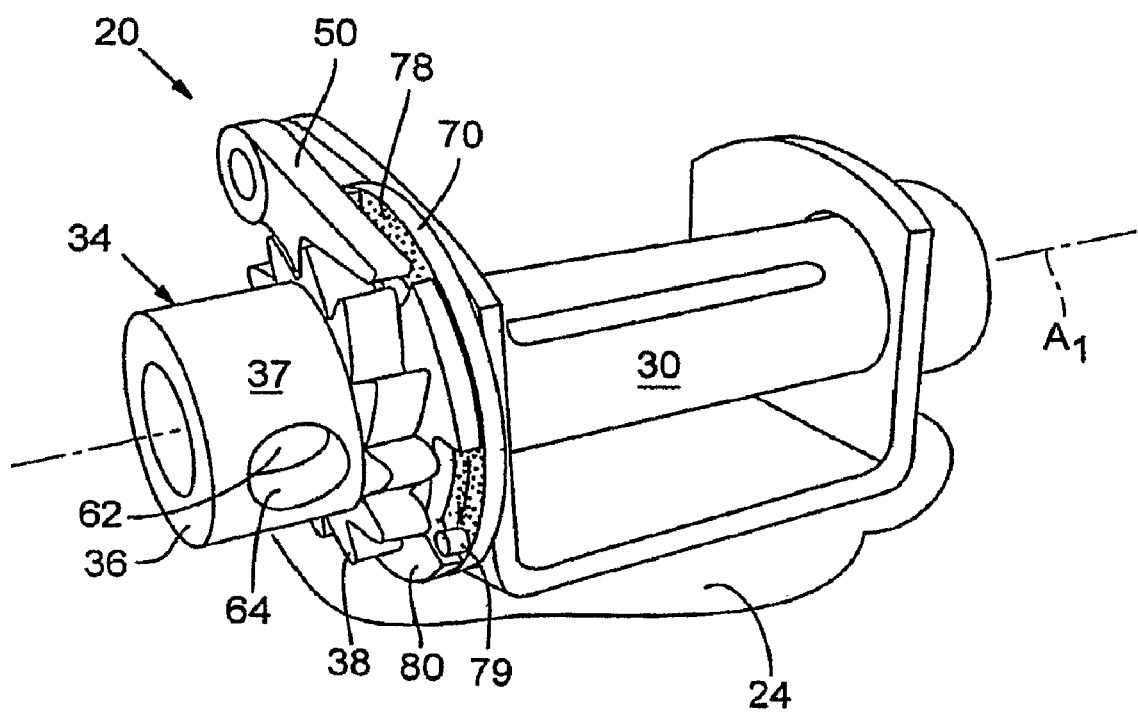
FIG. 1 is an oblique view of a winch system.

Winches are used to secure cargo to transport vehicles and for other purposes. In FIGS. 1-4 a winch system 20 is shown mounted to a frame 24 of a cargo carrying vehicle such as a flat bed trailer. Cargo is secured to the transport vehicle by an elongate member (not shown). In the illustrated embodiment, the elongate member would be a strap of fabric webbing, but the elongate member could also be of another appropriate material such as rope, chain, cable, or wire rope. The elongate member is secured to a winch spool shaft 30. In this instance the elongate member is attached by threading a strap through a slot 32 through the shaft 30 and held in place by friction once the winch is operated, but an elongate member could be attached in another way. The other end of the elongate member may be free so that the elongate member can be detachably secured to the cargo. Or the elongate member can extend over or around the cargo with its free end used to secure the elongate member to another portion of the transporting vehicle so that the elongate member encircles a portion of the cargo and holds it in place against the frame provided by the vehicle. Or the other end may be permanently secured to another portion of the vehicle. Such a winch can secure a cargo container or lumber, for example, to a railroad car, truck bed, or deck of a ship (not shown).

The shaft 30 is rotationally mounted relative to the frame 24. The shaft 30 can rotate about an axis $A_1$ of rotation to wrap the elongate member around the shaft 30. The winch system 20 has a drive system 34 secured to the shaft 30 to control the rotation of the shaft.

In the embodiment of FIGS. 1-4 the drive system 34 includes a body 36 having a generally cylindrical exterior surface 37 that is coaxial with the axis $A_1$ and a ring or series of ratchet teeth 38 evenly spaced around the axis $A_1$. The body 36 is mounted so that it can rotate relative to the shaft 30, but only to a limited extent as described below, such that, when the body 36 is rotated about the axis $A_1$, the shaft 30 normally also rotates as indicated by curved arrow in FIG. 2.

Figure 2:
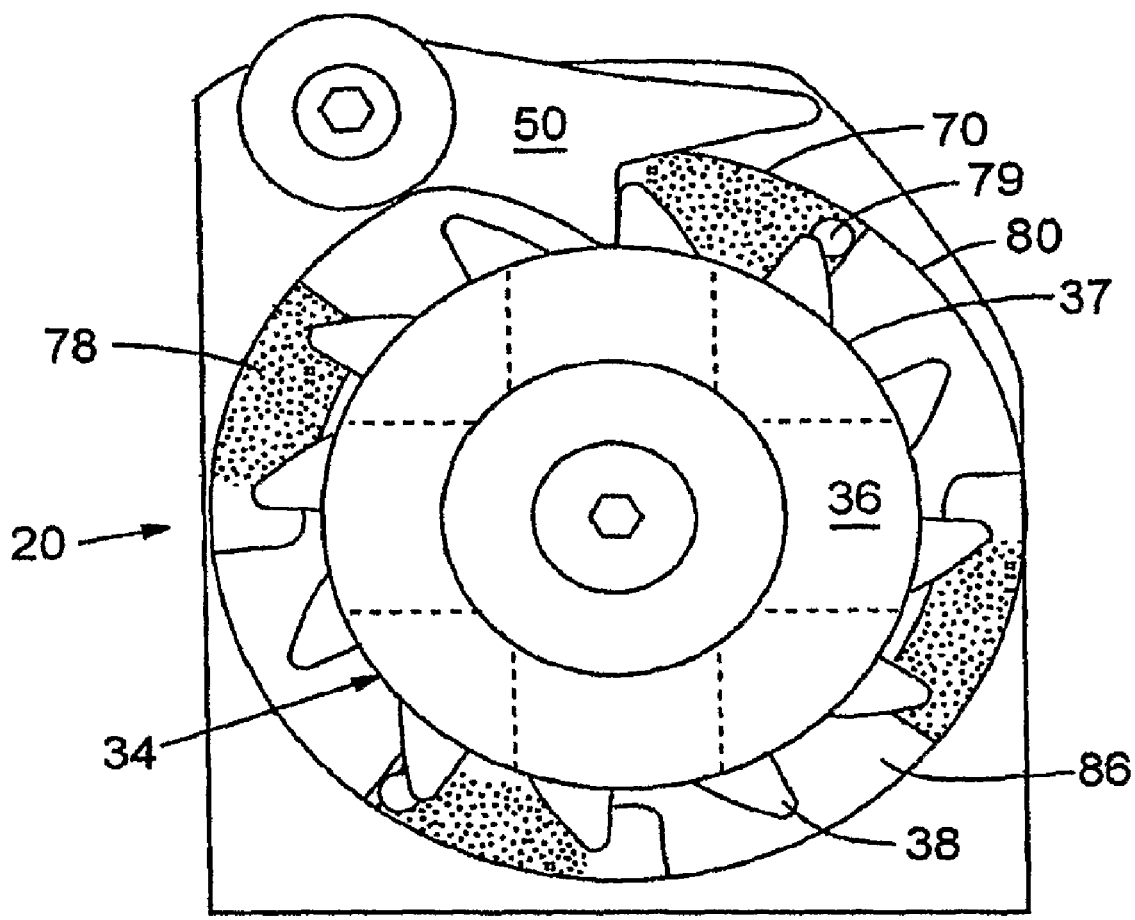
FIG. 2 is a vertical, plan view of the winch system shown in FIG. 1.
Figure 3:
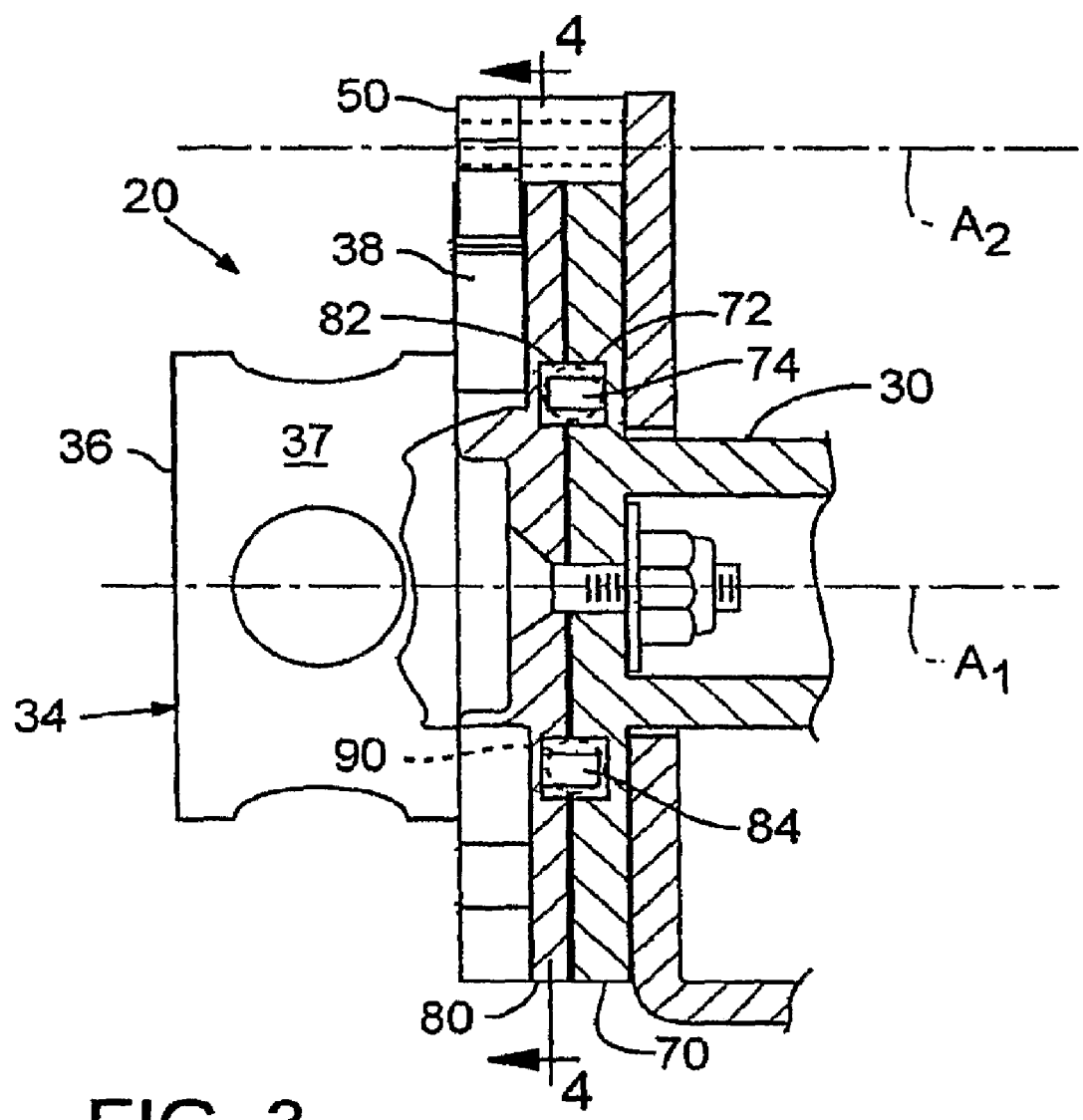
FIG. 3 is a vertical, sectional view taken along line 3--3 of FIG. 2.

A pawl 50 is rotationally mounted so that it can rotate about an axis $A_2$ between two positions. In FIGS. 1-3, the pawl 50 is shown in an engaged position wherein the pawl engages the series of ratchet teeth 38 such that the drive system 34 can rotate only in one direction when the pawl engages the teeth. To relieve tension on the elongate member, the pawl 50 can be rotated about the axis $A_2$ (raised) to a disengaged position, wherein the pawl does not engage the series of ratchet teeth 38. When the pawl 50 is in the disengaged position, the drive system 34 can rotate in both directions.

The body 36 of the drive system serves as a handle-engaging portion. The illustrated body 36 includes a series of radial openings 62 that are defined by interior surfaces 64 and are sized and shaped to receive a rod-like handle (not shown) that may be inserted by an operator through a pair of opposed openings 62.

When a handle is inserted into the body 36, the operator can use the handle to apply rotational force. The force is transmitted from the handle to the shaft 30 via the body 36. Thus, by applying a torquing force to the handle, the operator will urge the shaft 30 to rotate.

The body 36 is not rigidly connected to the shaft 30, but is connected in such a manner that the body 36 can rotate to a limited extent, about one quarter to one third turn, relative to the shaft when sufficient torquing force is applied to the body and rotation of the shaft 30 is inhibited.

In the system of FIGS. 1-4, this is accomplished by means of a transmission system that includes a plate 70 that is fixedly attached to or of unitary construction with the shaft 30 so that the plate 70 rotates with the shaft 30 about the Axis $A_1$. A second element of the transmission system is a plate 80 that is fixedly attached to or of unitary construction with the body 36 so that the plate 80 rotates with the body 36 about the Axis $A_1$. The plates 70, 80 face one another and are interconnected such that they normally rotate together about the Axis $A_1$ when sufficient torquing force is applied to the body. In the illustrated system, the plates 70, 80 define circular channels 72, 82 that face one another. Two pins 74 extend from the plate 70 into the channels 72, 82. And two pins 84 extend from the plate 80 into the channels 72, 82. The pins are positioned such that when the elongate member is not under tension, two or more pairs of pins 74, 84 are located at various positions around the channels 72, 82. In the illustrated system, there are two pairs of pins 74, 84. Each pair normally is located opposite the other on opposite sides of the axis $A_1$ as shown in FIG. 4A. Extending between each pair of pins is a compression spring 90.

Figure 4A:
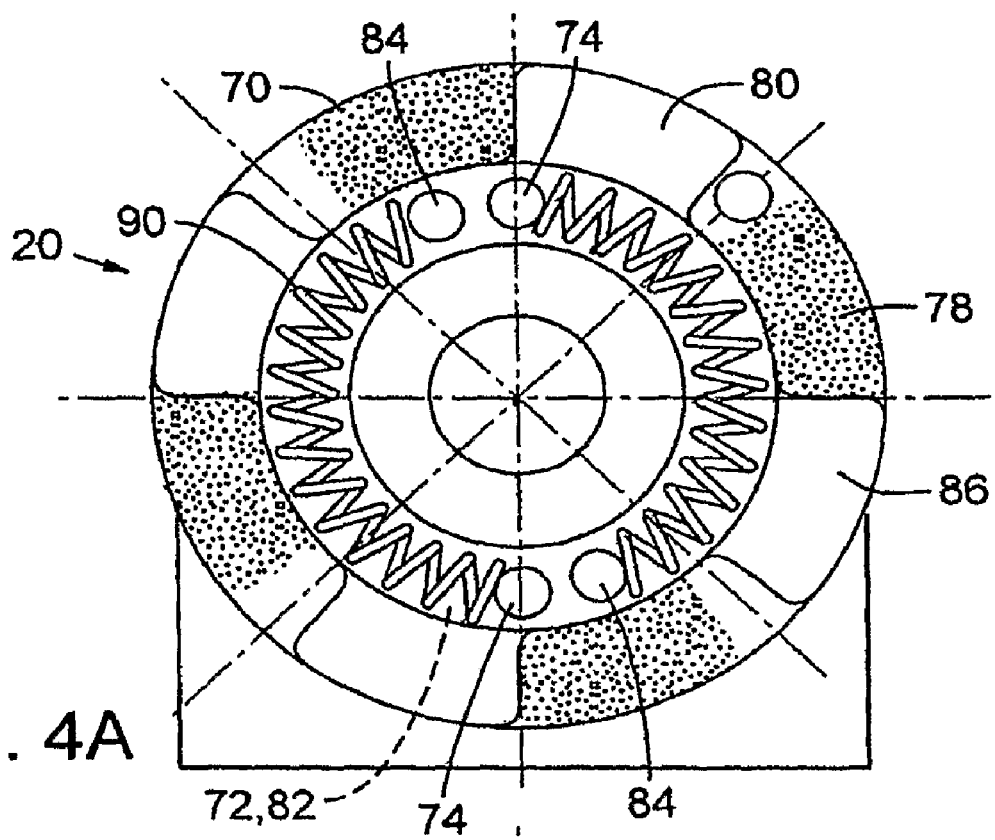
FIG. 4A is a vertical, sectional view taken along line 4--4 of FIG. 3.
Figure 4B:
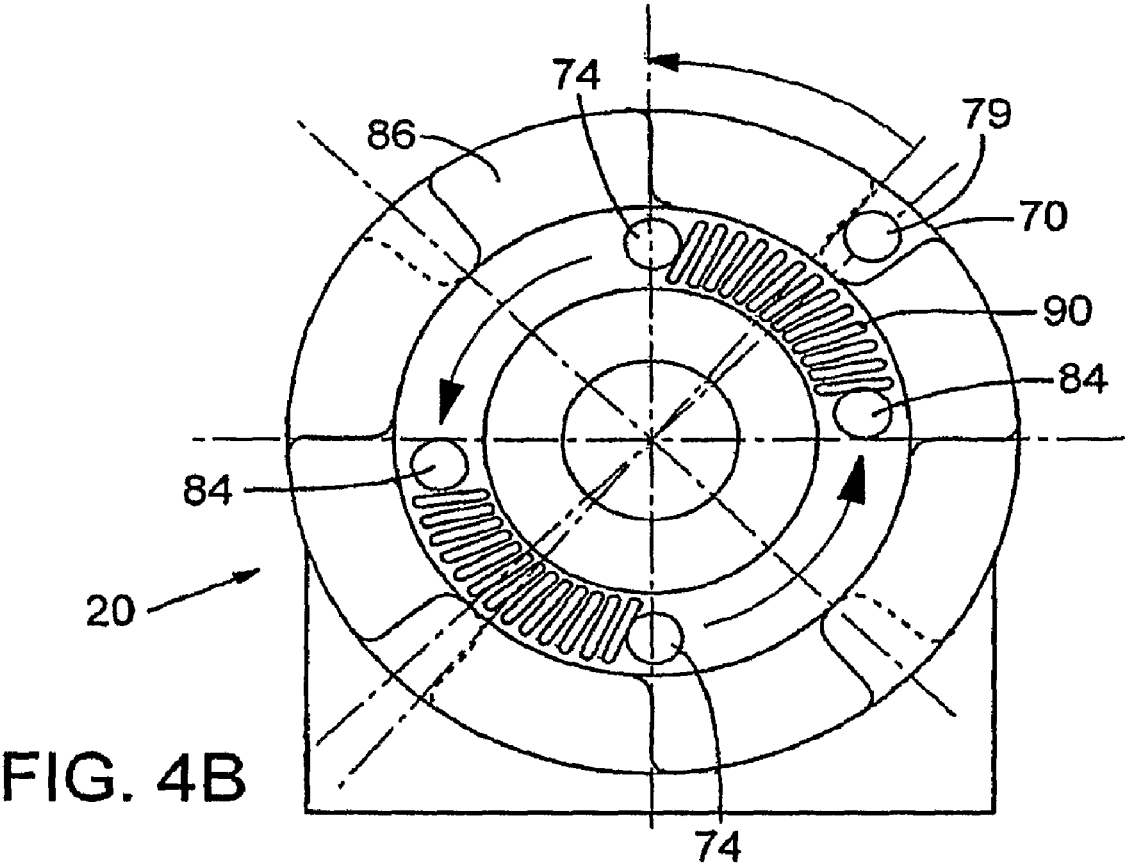
FIG. 4B is a vertical, sectional view taken along line 4--4 of FIG. 3.

The compression spring is sufficiently strong to normally hold the pins in the position shown in FIG. 4A such that the plates 70, 80 rotate together when the body 36 is rotated. However, once all the slack is taken out of the elongate member so that the plate 70 can rotate no further, the body 36 and plate 80 can be rotated further to a limited extent by applying sufficient torquing force to the handle. As the plate 80 rotates relative to the plate 70, the bias of the compression springs 90 is overcome and the springs compress as shown in FIG. 4B. The ratchet and pawl will hold the springs 90 in the compressed position until the pawl is released from the ratchet teeth.

The winch includes some form of indicium that indicates when the plates 70, 80 have been rotated relative to one another. When an operator can see that the plates 70, 80 are rotationally shifted relative to each other, that person will know that the elongate member is under tension and that the load is secure. If the load has shifted in transit such that the plates 70, 80 cease to be rotationally shifted relative to each other, the operator will know that the elongate member is loose and needs to be tightened or that the load may have shifted so that special care should be taken during unloading of the cargo.

In the system of FIGS. 1-4, indica are provided to assist the operator in detecting, at a glance, whether the plates 70, 80 are rotationally shifted relative to each other. The plate 70 is circular whereas the plate 80 is of a daisy-pedal shape, having pedals portions 86 that extend outwardly from a hub at the center. When the elongate member is not under tension, areas of color 78, indicated by hatching in FIGS. 2 and 4, show through openings between the pedal portions 86 of the plate 80. But when the elongate member is under tension and the plates 70, 80 are rotationally shifted relative to each other as shown in FIG. 4B, the colored areas 78 are covered by the pedals 86 and are no longer visible. Thus if an operator sees color areas 78, that person immediately knows that the elongate member may be loose and should be tightened. If no color appears, the elongate member is under tension and tightening is not necessary. The color pattern could, of course, be reversed such that the colored portion appears only when the elongate member is sufficiently tensioned.

To prevent over-torquing, one or more stops or pins may be provided to limit the rotation of the plate 80 relative to the plate 70. An illustrated pin 79 extends from the plate 70 into an area between two of the pedal portions 86. The pin is located so that the plate 80 cannot be rotated so far as to totally crush and thereby damage the compression springs 90. Thus when a pedal portion 86 hits the pin 79, the plate 80 cannot further rotate unless the plate 70 can rotate with it.

It will be apparent that numerous mechanical arrangements can be used to provide the same effect. In particular a variety of different biasing systems can be used instead of compression springs; and indicia other than daisy-pedal displays can be used. The biasing device in any such system should be selected or adjusted such that a readily visible indicium warns the operator when the elongate member is not sufficiently tensioned.

Examples of other winch systems appear in FIGS. 5-10, where similar elements are numbered as in FIGS. 1-4, with numbers incremented by some multiple of 100. The illustrated winch systems are particularly suited for auto carriers where the winch spool may be on a long shaft extending across all or a large portion of the width of a trailer. Examples of such systems are shown in U.S. Pat. Nos. 6,558,092 and 6,960,053, each of which is incorporated herein by reference. But the mechanical features described herein may also be used in other winch systems.

FIGS. 5-7 show a winch system wherein a drive system 134 is connected to a winch spool shaft 130 in a different manner. In particular, a transmission system includes an interior shaft (or rod) 180 that is fixedly attached to or of unitary construction with the body 136 so that the shaft 180 rotates with the body 136 about the Axis $A_1$. The shafts 130 and 180 are coaxial with the shaft 180 nested within the shaft 130 and are interconnected such that they normally rotate together about the Axis $A_1$ when sufficient torquing force is applied to the body.

In the illustrated system, a body 190 of rubber or other resilient material is provided inside the shaft 130 and is fixedly connected to that shaft or caged such that the body 190 cannot rotate relative to the shaft 190. A paddle or fin 184 extends from the shaft 180 into a slot defined in the body 190. The body 190 and fin 184 are positioned such that when the elongate member is not under tension, the body 190 is in its at-rest shape. The body 190 is prevented from rotating by fins 191 that extend from the inner surface of the shaft 130.

The body is 190 sufficiently rigid to normally substantially hold its at-rest shape such that the shafts 130, 180 rotate together when the body 136 is rotated. However, once all the slack is taken out of the elongate member so that the shaft 130 can rotate no further, the body 136 and shaft 180 can be rotated further to a limited extent by applying sufficient torquing force to a handle 166. As the shaft 180 rotates relative to the shaft 130 as shown in FIG. 6, the body 190 deforms and/or compresses to allow the relative rotation. The ratchet teeth and pawl will hold the body 190 in the deformed/compressed position until the pawl is released from the ratchet teeth.

The winch includes some form of indicium that indicates when the shafts 130, 180 have been rotated relative to one another. When an operator can see that the shafts 130, 180 are rotationally shifted relative to each other, that person will know that the elongate member is under tension and that the load is secure. If the load has shifted in transit such that the shafts 130, 180 cease to be rotationally shifted relative to each other, the operator will know that the elongate member is loose and needs to be tightened or that the load may have shifted so that special care should be taken during unloading of the cargo.

In the system of FIGS. 5-7, indica are provided to assist the operator in detecting, at a glance, whether the shafts 130, 180 are rotationally shifted relative to each other. A circular plate 170 is fixedly attached to or of unitary construction with the shaft 130 and rotates with that shaft. The drive system 134 has a plurality of pedals 186 that extend outwardly from a hub at the center. When the elongate member is not under tension, areas of color 178, indicated by hatching in FIGS. 7, show through openings between the pedals 186. But when the elongate member is under tension and the shafts 130, 180 are rotationally shifted relative to each other as shown in FIG. 7B, the colored areas 178 are covered by the pedals 186 and are no longer visible. Thus if an operator sees color areas 178, that person immediately knows that the elongate member may be loose and should be tightened. If no color appears, the elongate member is under tension and tightening is not necessary. The color pattern could, of course, be reversed such that the colored portion appears only when the elongate member is sufficiently tensioned.

To prevent over-torquing, one or more stops or pins may be provided to limit the rotation of the shaft 130 relative to the shaft 180. An illustrated pin 179 extends from the plate 170 into a slot 172 defined in the drive system 134. The pin is located so that the shaft 180 cannot be rotated so far as to totally crush and thereby damage the body 190. Thus when the pin 179 reaches the end of the slot 172 as shown in FIG. 7B, the shaft 180 cannot further rotate unless the shaft 130 can rotate with it.

As second limiting device is shown in FIG. 5. An illustrated pin 139 extends through and is fixedly attached to shaft 130. The pin 139 also extends through slots 182 defined in the shaft 180. The pin 139 and slots 182 are sized and located so that the shaft 180 cannot be rotated so far as to totally crush and thereby damage the body 190. Thus when the pin 139 reaches the ends of the slots 182, the shaft 180 cannot further rotate unless the shaft 130 can rotate with it.

Figures 8, 9:
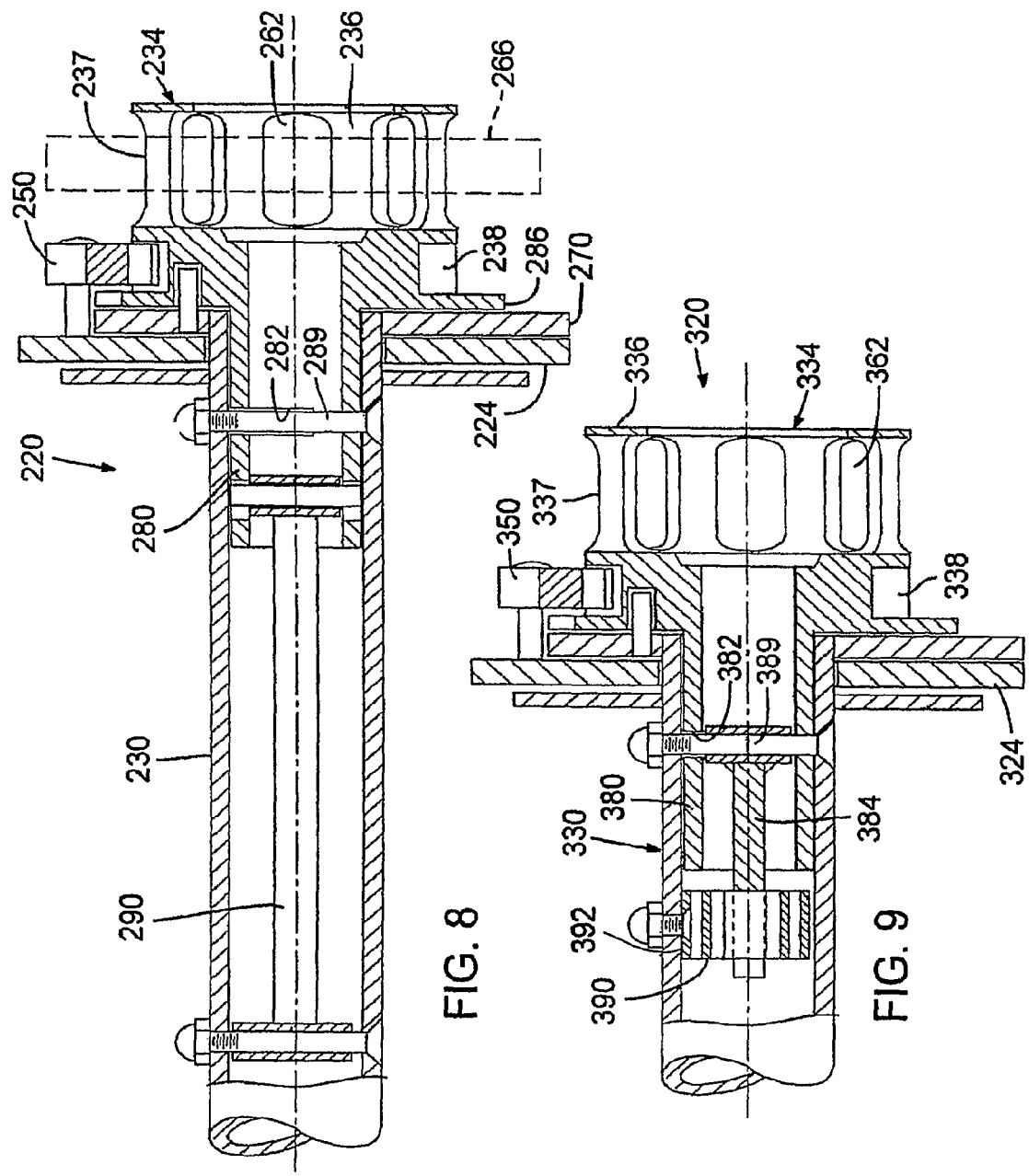
FIG. 8 is a vertical, sectional view of a third winch system.
FIG. 9 is a vertical, sectional view of a fourth winch system.

FIG. 8 shows a winch system wherein a drive system 234 is connected to a winch spool shaft 230 in a different manner. In particular, a transmission system includes an interior shaft (or rod) 280 that is fixedly attached to or of unitary construction with the body 236 so that the shaft 280 rotates with the body 236 about the Axis $A_1$. The shafts 230 and 280 are coaxial with the shaft 280 nested within the shaft 230 and are interconnected such that they normally rotate together about the Axis $A_1$ when sufficient torquing force is applied to the body.

In the illustrated system, a torsion bar of steel or other sufficiently strong and resilient material is provided inside the shaft 230 and is fixedly connected at one end to that shaft such that the one end of the bar 290 cannot rotate relative to the shaft 290. The other end of the bar 290 is connected to the shaft 280 such that the other end of the bar 290 cannot rotate relative to the shaft 280. The bar 290 is positioned such that when the elongate member is not under tension, the body 290 is in its at-rest (untwisted) shape.

The body is sufficiently rigid that the shafts 230, 280 normally rotate together when the body 236 is rotated. However, once all the slack is taken out of the elongate member so that the shaft 230 can rotate no further, the body 236 and shaft 280 can be rotated further to a limited extent by applying sufficient torquing force to a handle 266. As the shaft 280 rotates relative to the shaft 230, the bar 290 twists to allow the relative rotation. The ratchet teeth and pawl will hold the body 190 in the twisted position until the pawl is released from the ratchet teeth.

FIG. 9 shows another winch system. A drive system 334 is connected to a winch spool shaft 330 in a different manner. In particular, a transmission system includes an interior shaft (or rod) 380 that is fixedly attached to or of unitary construction with the body 336 so that the shaft 380 rotates with the body 336 about the Axis $A_1$. The shafts 330 and 380 are coaxial, with the shaft 380 nested within the shaft 330, and are interconnected such that they normally rotate together about the Axis $A_1$ when sufficient torquing force is applied to the body.

In the illustrated system, a body 390 of rubber or other resilient material is secured to a rod 384 that is fixedly connected to and extends coaxially from the shaft 380. The body 390 does not have a circular cylindrical outer surface, e.g. is cubic, and is caged within a structure 392 such that the body 390 cannot freely rotate relative to the shaft 330. The body 390 and cage structure 392 are positioned such that when the elongate member is not under tension, the body 390 is in its at-rest shape.

The body 390 is sufficiently rigid to normally substantially hold its at-rest shape such that the shafts 330, 380 rotate together when the body 336 is rotated. However, once all the slack is taken out of the elongate member so that the shaft 330 can rotate no further, the body 336 and shaft 380 can be rotated further to a limited extent by applying sufficient torquing force to a handle. As the shaft 380 rotates relative to the shaft 330, the body 390 deforms and/or compresses within the cage structure 392 to allow the relative rotation. The ratchet teeth and pawl will hold the body 390 in the deformed/compressed position until the pawl is released from the ratchet teeth.

Figure 10:
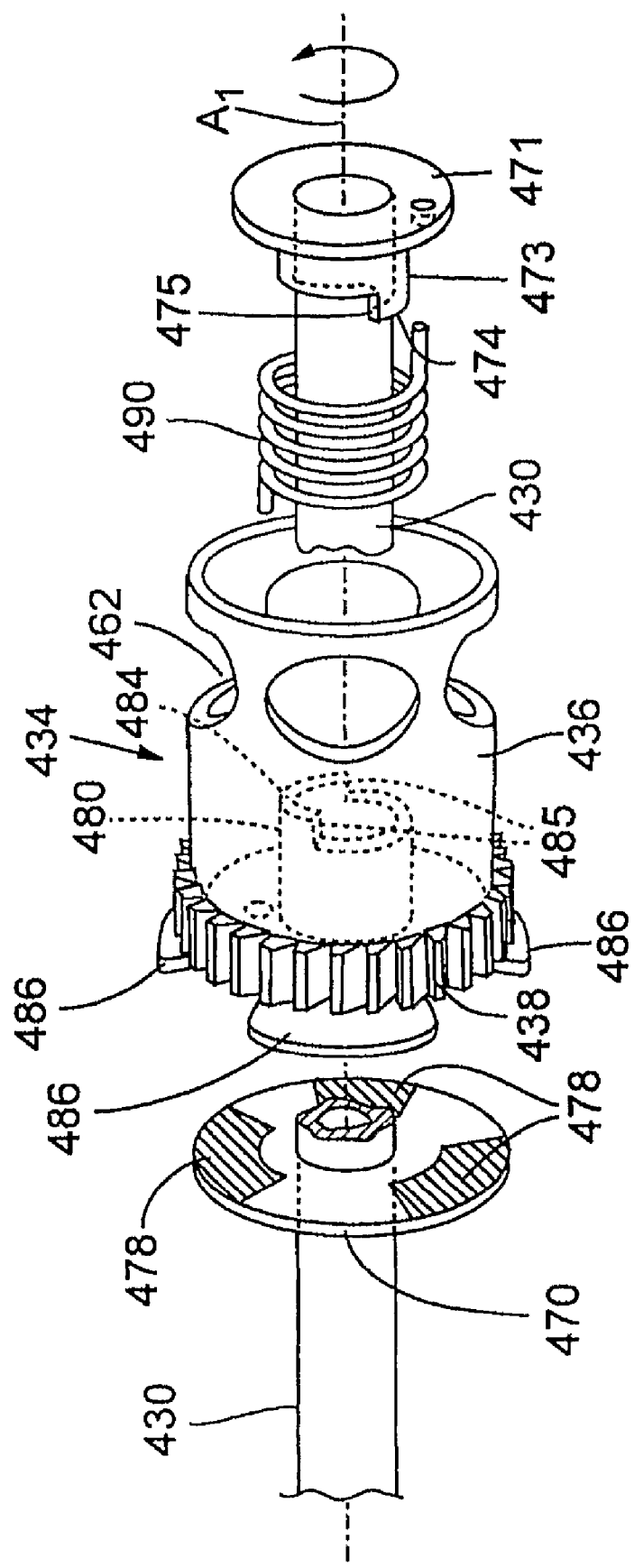
FIG. 10 is a partial oblique exploded view of a fifth winch system.

FIG. 10 shows yet another winch system. A drive system 434 is connected to a winch spool shaft 430 in a different manner. In particular, a transmission system includes an interior sleeve (or collar) 480 that is fixedly attached to or of unitary construction with a body 436. The shaft 430 and sleeve 480 are coaxial and are interconnected such that they normally rotate together about the Axis $A_1$ when sufficient torquing force is applied to the body 436. The sleeve 480 has a cylindrical central bore that is sized to receive the shaft 430 so that the shaft can rotate to a limited extent relative to the body 436 about the Axis $A_1$.

A plate 470 is fixedly attached to or of unitary construction with the shaft 430 so that the plate 470 rotates with the shaft 430 about the Axis $A_1$. A stop member 471, here shown in the form of an end cap or collar, is fixedly attached to or of unitary construction with the shaft 430 so that the collar 471 rotates with the shaft 430 about the Axis $A_1$. The plate 470 and the stop member 471 are spaced apart a sufficient distance to cage a portion of the body 436 therebetween. The plate 470 and the stop member 471 should not be so close together as to tightly engage and prevent the body 436 from rotating relative to the shaft 430. But the plate 470 and the stop member 471 best are sufficiently close together as to prevent the body 436 from sliding axially along the shaft 430 to any great extent. A helical spring 490 surrounds the shaft 430. One end of the spring 490 is connected to the drive system 434; the other end of the spring is connected to the shaft 430, by connection to the stop member 471 in the illustrated embodiment.

The illustrated stop member 471 has a cylindrical portion 473. The cylindrical portion 473 includes an extension tab 474 that extends axially inwardly. The illustrated extension tab 474 is a portion of a cylinder. A mating extension tab 484 extends axially outwardly from the sleeve 480 and also is a portion of a cylinder. The tabs are generally co-cylindrical and have stop surfaces 475, 485 that are positioned to face each other. The sizes of the tabs are such that they together comprise less than a full cylinder, which allows the collars 473 and sleeve 480 to rotate relative to one another to a limited extent, about one quarter to one third turn. The spring 490 surrounds portions of both the collar 473 and sleeve 480 including the tabs 474, 484.

The spring 490 is sufficiently rigid to normally substantially hold its at-rest shape such that the shaft 430 and sleeve 480 rotate together when the body 436 is rotated. However, once all the slack is taken out of the elongate member so that the shaft 430 can rotate no further, the body 436 and sleeve 480 can be rotated further to a limited extent by applying sufficient torquing force, to a handle (not shown) that extends through radial openings 462, to overcome the bias of the spring 490. As the sleeve 480 rotates relative to the shaft 430, the spring 490 is coiled more tightly until two facing stop surfaces 475, 485 engage. Once the two facing stop surfaces 475, 485 engage, the body 436 can rotate no further relative to the shaft 430. This prevents over-tightening of the spring. Ratchet teeth 438 and a pawl (not shown) will hold the spring 490 in the over-coiled position until the pawl is released from the ratchet teeth. (It should be appreciated that the ratchet mechanism could be reversed such that extra torquing will cause the spring 490 to uncoil instead of over-coil.)

Indica are provided to assist the operator in detecting, at a glance, whether the shaft 430 and body 436 are rotationally shifted relative to each other. For example, the illustrated plate 470 is circular. Pedals 486 extend outwardly from the body 436, which is conveniently achieved using a plate that is of a daisy-pedal shape, with a hub at the center and pedals 486 extending outwardly from the hub. The plate is secured to or of integral construction with the body 436 so the pedals 486 and body rotate together, with each pedal having a surface positioned to face the plate 470. When an elongate member extending from the shaft 430 is not under tension, areas of color 478, indicated by hatching, show through openings between the pedals 486. But when the elongate member is under tension and the shaft 430 and body 436 are rotationally shifted relative to each other, the colored areas 478 are covered by the pedals 486 and are no longer visible. Thus if an operator sees color areas 478, that person immediately knows that the elongate member may be loose. If no color appears, the elongate member is under tension and tightening is not necessary.

Still other, not illustrated, embodiments are possible. For example, instead of a color area that appears and disappears by movement of a daisy pedal structure, a cam or crank device could be provided to cause a piston, which may or may not be brightly colored, to extend outwardly or to retract when a drive member is rotated beyond the point where an elongate member is fully tensioned. Other types of biasing member, such as a clock spring or other types of helically tensioned or compressed (garage door) springs could be used, And other similar variations will be apparent to the skilled artisan.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claim.

The invention claimed is:

1. A manually driven winch system for use to rotate a shaft that is rotatably mounted on a frame and that is adapted for attachment to an elongated flexible member so that the elongated flexible member can be wrapped around the shaft by rotating the shaft about its axis of rotation, the winch system comprising:
    a shaft adapted for attachment to an elongated flexible member;
    a drive system secured to the shaft to rotate the shaft about an axis of rotation and thereby tension an elongated flexible member attached to the shaft, the drive system including (a) a series of ratchet teeth that are spaced around the axis and that revolve around the axis as the drive system rotates and (b) a handle-engaging portion configured to transmit rotational force from a handle to the drive system to urge the drive system to rotate;
    a biasing member that connects the drive system to the shaft in such a manner that the shaft normally rotates with the drive system and such that the drive system rotates independently of the shaft when the bias of the biasing member is overcome;
    at least one indicum that, responsive to movement of the drive system relative to the shaft, signals if tension on the elongated flexible member has decreased to below a predetermined amount; and
    a pawl that is movable between an engaged position wherein the pawl engages the series of ratchet teeth such that the shaft can rotate in only one direction and a disengaged position wherein the pawl does not engage the series of ratchet teeth so the shaft can rotate in both directions.

2. The system of claim 1 wherein the biasing member is spring.

3. The system of claim 1 wherein the biasing member is a body of elastomeric material.

4. The system of claim 1 wherein the biasing means is of such a capacity that the drive system rotates independently of the shaft when the elongated flexible member is tensioned to a predetermined extent.

5. The system of claim 1 wherein the drive system can rotate about the axis of rotation independently of the shaft to a limited extent.

6. A manually driven winch system for use to rotate a shaft that is rotatably mounted on a frame and that is adapted for attachment to an elongated flexible member so that the elongated flexible member can be wrapped around the shaft by rotating the shaft about its axis of rotation, the winch system comprising:
    a shaft adapted for attachment to an elongated flexible member;
    a drive system secured to the shaft to rotate the shaft about an axis of rotation and thereby tension an elongated flexible member attached to the shaft, the drive system including (a) a series of ratchet teeth that are spaced around the axis and that revolve around the axis as the drive system rotates and (b) a handle-engaging portion configured to transmit rotational force from a handle to the drive system to urge the drive system to rotate;
    a biasing member that connects the drive system to the shaft in such a manner that the shaft normally rotates with the drive system and such that the drive system rotates independently of the shaft when the bias of the biasing member is overcome;
    at least one indicum that, responsive to movement of the drive system relative to the shaft, signals whether the elongate member is under tension on the elongated flexible member has decreased to below a predetermined amount, the at least one indicium comprising a color area and a member that is movable relative to the color area between a first position wherein the member covers the color area and a second position wherein at least a portion of the color area is exposed to view; and
    a pawl that is movable between an engaged position wherein the pawl engages the series of ratchet teeth such that the shaft can rotate in only one direction and a disengaged position wherein the pawl does not engage the series of ratchet teeth so the shaft can rotate in both directions.

7. A method of securing cargo to a frame, the method comprising:
    placing a cargo item on a frame;
    securing a portion of an elongated flexible member such that the member engages and extends from the cargo item;
    providing a manually driven winch system on the frame, the winch system comprising (a) a shaft attached to another portion of the elongated flexible member, (b) a drive system secured to the shaft to rotate the shaft about an axis of rotation and thereby tension an elongated flexible member attached to the shaft, the drive system including (1) a series of ratchet teeth that are spaced around the axis and that revolve around the axis as the drive system rotates and (2) a handle-engaging portion configured to transmit rotational force from a handle to the drive system to urge the drive system to rotate, (c) a biasing member that connects the drive system to the shaft in such a manner that the shaft normally rotates with the drive system and such that the drive system rotates independently of the shaft when the bias of the biasing member is overcome, (d) at least one indicum that, responsive to movement of the drive system relative to the shaft, signals whether the elongate member is under if tension on the elongated flexible member has decreased to below a predetermined amount, and (e) a pawl that is movable between an engaged position wherein the pawl engages the series of ratchet teeth such that the shaft can rotate in only one direction and a disengaged position wherein the pawl does not engage the series of ratchet teeth so the shaft can rotate in both directions;

rotating the shaft and thereby tensioning the elongated flexible member sufficiently that the at least one indicum signals that the elongate member is at or above a predetermined amount tension; and periodically viewing the at least one indicum to detect whether the tension on the elongated flexible member has decreased to below the predetermined amount.

8. The method of claim 7 further comprising further rotating the shaft to tighten the elongated flexible member if, upon viewing, the at least one indicum is observed to indicate that the tension on the elongated flexible member has decreased to below the predetermined amount.

9. The system of claim 7 wherein the biasing member is spring.

10. The system of claim 7 wherein the biasing member is a body of elastomeric material.

11. The system of claim 7 wherein the indicium comprises:
a color area; and
a member that is movable relative to the color area between a first position wherein the member covers the color area and a second position wherein at least a portion of the color area is exposed to view.

12. The system of claim 7 wherein the biasing means is of such a capacity that the drive system rotates independently of the shaft when the elongated flexible member is tensioned to a predetermined extent.

13. The system of claim 7 wherein the drive system can rotate independently of the shaft to a limited extent.

* * * * *